United States Patent [19]

Nakashima et al.

[11] Patent Number: 4,907,428
[45] Date of Patent: Mar. 13, 1990

[54] CENTRALIZED LOCK DEVICE FOR VEHICLE STORAGE CONTAINER

[75] Inventors: Tai Nakashima, Tokyo, Japan; Tadao Kitagawa, Worthington, Ohio

[73] Assignee: Honda Giken Kogyo Kabushiki Kaisha, Tokyo, Japan

[21] Appl. No.: 119,840

[22] Filed: Nov. 12, 1987

[30] Foreign Application Priority Data

Nov. 12, 1986 [JP] Japan ................... 61-270374

[51] Int. Cl.$^4$ ............................................. E05B 53/00
[52] U.S. Cl. ...................................... 70/264; 70/256;
                              70/279; 296/76; 180/219
[58] Field of Search .................... 70/63, 78, 82-84,
        70/233-236, 238, 239, 256, 262-264, 277, 279;
           180/218-220; 280/263, 281 R; 296/37.1, 76,
                  78.1, 198; 312/107, 107.5, 109, 216-220

[56] References Cited

U.S. PATENT DOCUMENTS

| | | | |
|---|---|---|---|
| 2,796,288 | 6/1957 | Green | 296/76 |
| 2,797,434 | 7/1957 | Vigmostad | 296/76 X |
| 3,016,968 | 1/1962 | Lenz et al. | 70/256 X |
| 3,064,752 | 11/1962 | Deibel et al. | 70/262 X |
| 3,113,447 | 12/1963 | Oishei | 296/76 X |
| 3,831,408 | 8/1974 | Featherman | 70/279 X |
| 3,836,945 | 9/1974 | Kinoshita et al. | 70/277 X |
| 3,882,291 | 5/1975 | Chiboroski | 312/216 X |
| 4,057,306 | 11/1977 | Resch, Jr. | 312/218 |
| 4,073,170 | 2/1978 | Miyabayashi et al. | 70/256 |
| 4,364,249 | 12/1982 | Kleefeldt | 70/264 |
| 4,469,382 | 9/1984 | Slaats et al. | 312/218 X |
| 4,522,442 | 6/1985 | Takenaka | 296/37.1 |
| 4,619,476 | 10/1986 | Kawasaki | 296/76 X |
| 4,632,446 | 12/1986 | Douglass | 312/216 X |
| 4,719,775 | 1/1988 | Pross et al. | 70/262 X |
| 4,726,203 | 2/1988 | Komuro | 70/275 X |
| 4,762,197 | 8/1988 | Yamada et al. | 180/219 |

Primary Examiner—Gary L. Smith
Assistant Examiner—Suzanne L. Dino
Attorney, Agent, or Firm—Lyon & Lyon

[57] ABSTRACT

A locking arrangement is described that is particularly adapted for use on motorcycles having plural storage containers and that includes a key-actuated locking device and latch release operators disposed in a central location and remote from the container latching mechanisms. The locking device is operative in one position to enable release of the latching mechanisms on the respective storage containers by each associate operator and in another position to prevent such enablement.

8 Claims, 11 Drawing Sheets

CENTRALIZED LOCK DEVICE FOR VEHICLE STORAGE CONTAINER

BACKGROUND OF THE INVENTION

The present invention relates to locking devices for vehicle storage containers. More particularly, the invention involves a centralized locking arrangement utilizable on motorcycles, or the like, for selectively locking and unlocking plural storage containers, such as a trunk container and side containers spaced from said trunk containers.

In motorcycles of large size there is commonly provided a trunk container or bag in a central upper portion of the rear of the vehicle body and saddle bags at left and right sides of the trunk bag. In the prior art, locking mechanisms are provided on each respective bag in order to secure the access to each. Such lock mechanisms generally provide an independent key cylinder device for each of the bags, the locking and unlocking, accordingly, being performed by inserting a key individually into each of the key cylinder devices.

In the described prior art trunk bag and saddle bag arrangements, each of the locking mechanisms necessitates locking and unlocking each bag separately. Moreover, as is usual, in order to reduce the number of required keys, the same key is capable of operating each separate locking mechanism. Also, the key used for unlocking the bags is the same key used for the main electrical system switch of the vehicle.

Consequently, in view of the above, such bag locking arrangements that require the separate locking or unlocking of each lock mechanism and that, further, employ the vehicle ignition key for this purpose, create the problem that the engine must be stopped each time it is desired to gain access to the interior of one or more of the bags.

It is to the amelioration of this problem, therefore, that the present invention is directed.

SUMMARY OF THE INVENTION

To solve the above mentioned problem, it is an object of the present invention to provide a centralized lock device which places each terminal lock mechanism simultaneously in its locked or unlocked condition by simply operating a single key cylinder device.

More particularly, it is an object of the invention to provide a centralized lock device in a vehicle having plural storage bags comprising a terminal lock mechanism provided on each of the bags carried on the vehicle body; a centralized control apparatus having a switch mechanism which is capable of simultaneously switching each of said terminal lock mechanisms so as to produce an unlocking condition in which said terminal lock mechanisms are individually unlatchable or a locking condition in which they are not unlatchable; and a single key cylinder device for interlocking and switching said switching mechanism of said centralized control apparatus.

The described centralized control apparatus interlocks with the terminal lock mechanism of each of the bags and with a single key cylinder device. Thus, when the key is operated and the key cylinder device is actuated to the lock position, the switching mechanism of the centralized control apparatus is switched to the lock position by interlocking with the key cylinder device. Therefore, it is impossible to unlock each of the terminal lock portions simultaneously and to open and close each of the bags. On the other hand, if the key cylinder device is operated to the unlock position, since the switching mechanism of the centralized control apparatus is switched into the unlock position by interlocking with the key cylinder device, it becomes possible to simultaneously unlock each of the terminal lock mechanisms whereby each of the bags can be opened or closed without operating the key.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENT

Figure 1:
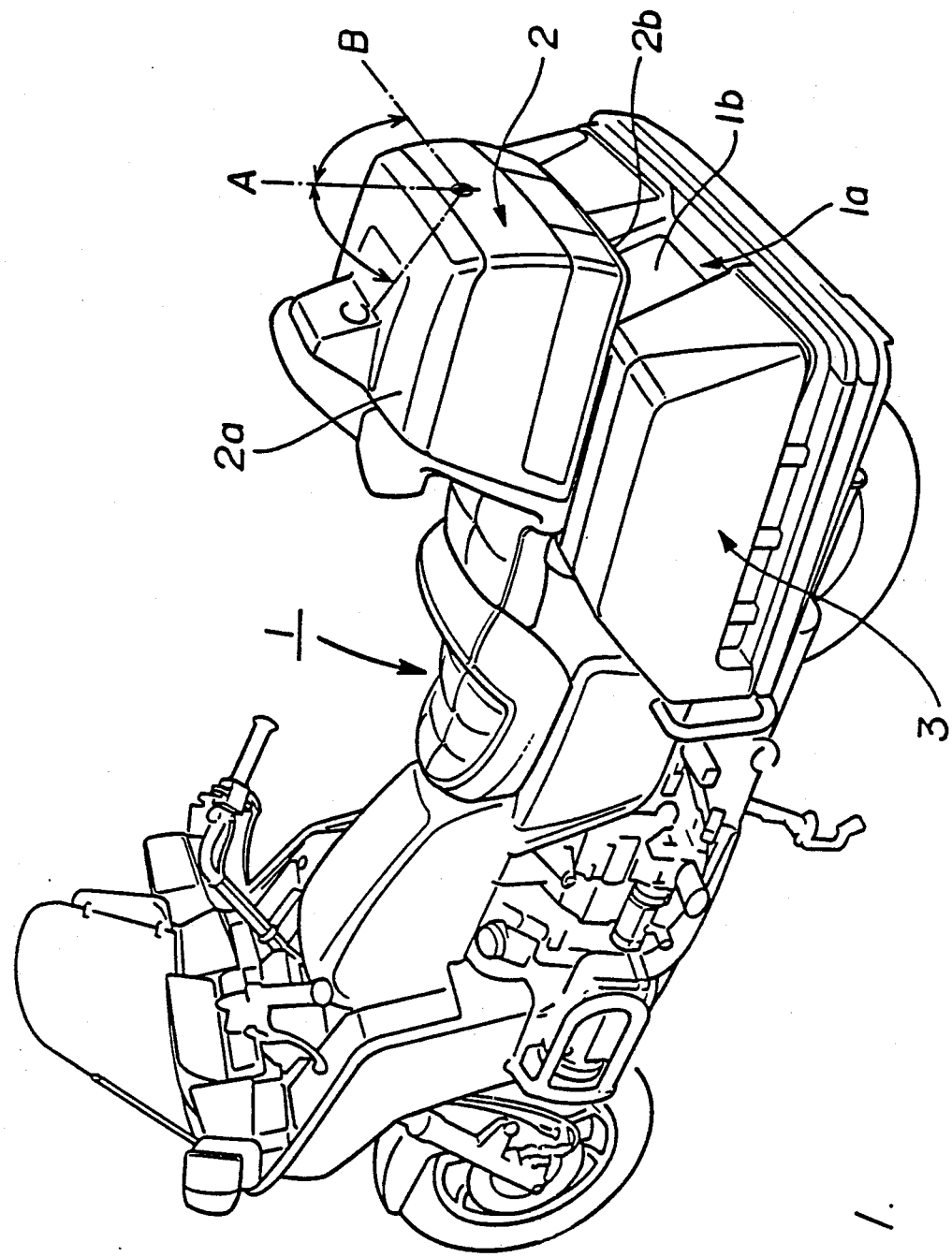
FIG. 1 is a perspective illustration of a motorcycle of the type for utilizing the present invention.
Figure 2:
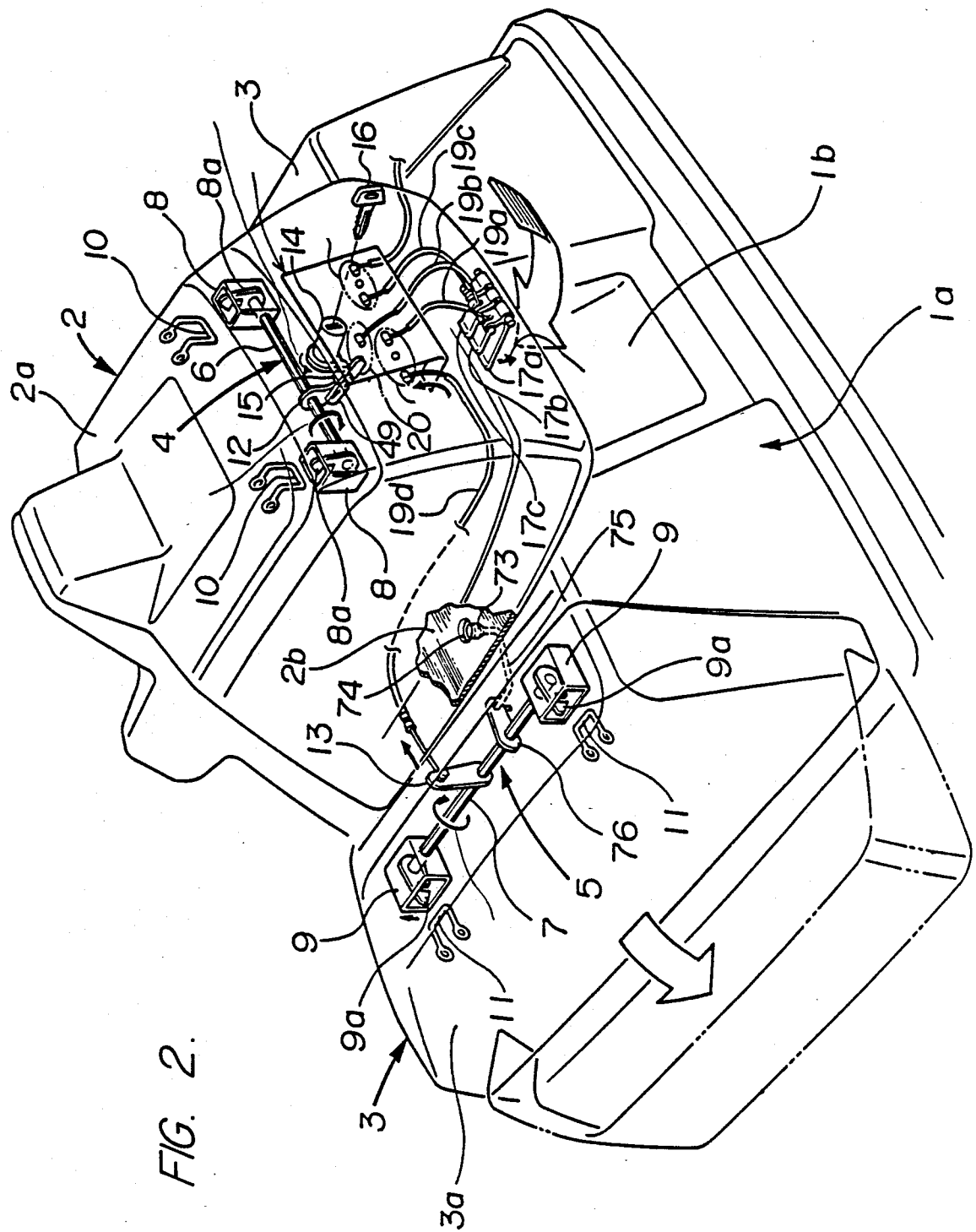
FIG. 2 is an enlarged perspective representation illustrating operating parts of the present invention.

FIG. 1 generally illustrates, a motorcycle carrying a trunk bag 2 and a pair of side or saddle bags 3 and having a centralized lock device according to the present invention. FIG. 2 illustrates, in an enlarged scale, the trunk and saddle bag arrangement of FIG. 1 and wherein certain of the operating parts in the interior of the bags can be viewed.

As shown, in the center of the rear portion of the vehicle body 1 of the motorcycle is provided a trunk bag 2, to the left and right sides of which saddle bags 3, 3 are provided. Since the saddle bags 3, 3 are provided symmetrically on the left and right sides of the vehicle, the following description is directed principally to only the saddle bag on the left side thereof. The trunk bag 2 has a lid 2a that opens upwardly. Also, a base portion 2b of the trunk bag rests on a rear cover 1a closing the extending slightly rearwardly. Further, reference numeral 1b indicates a recess formed on the rear cover 1a beneath the extended portion of the base portion 2b. The lid 3a is provided on the saddle bag 3 for opening and closing, as shown by the arrow. Terminal lock mechanisms 4 and 5 are provided, respectively, in the trunk bag 2 and the saddle bag 3. The terminal lock mechanisms 4 and 5 are constituted respectively by rotary shafts 6, 7 rotatably mounted on brackets (not shown), latches 8, 9 mounted on each of the ends of the rotary shafts 6, 7, as well as hooks 10, 11 mounted on the lids 2a, 3a of the trunk bag 2 and the saddle bag 3. The hooks 10, 11, as shown, engage pawls 8a, 9a of latches 8, 9. Fixed for rotation on each of the respective rotary shafts 6, 7 are mounted rotary levers 12, 13. The shafts 6, 7 are adapted to be rotated and operated in a locking direction by means of return springs (not shown). Therefore, if the lids 2a and 3a are closed, locking is effected by the fact that the hook 10 or 11 engages automatically with the associated pawl 8a or 9a.

Figure 7:
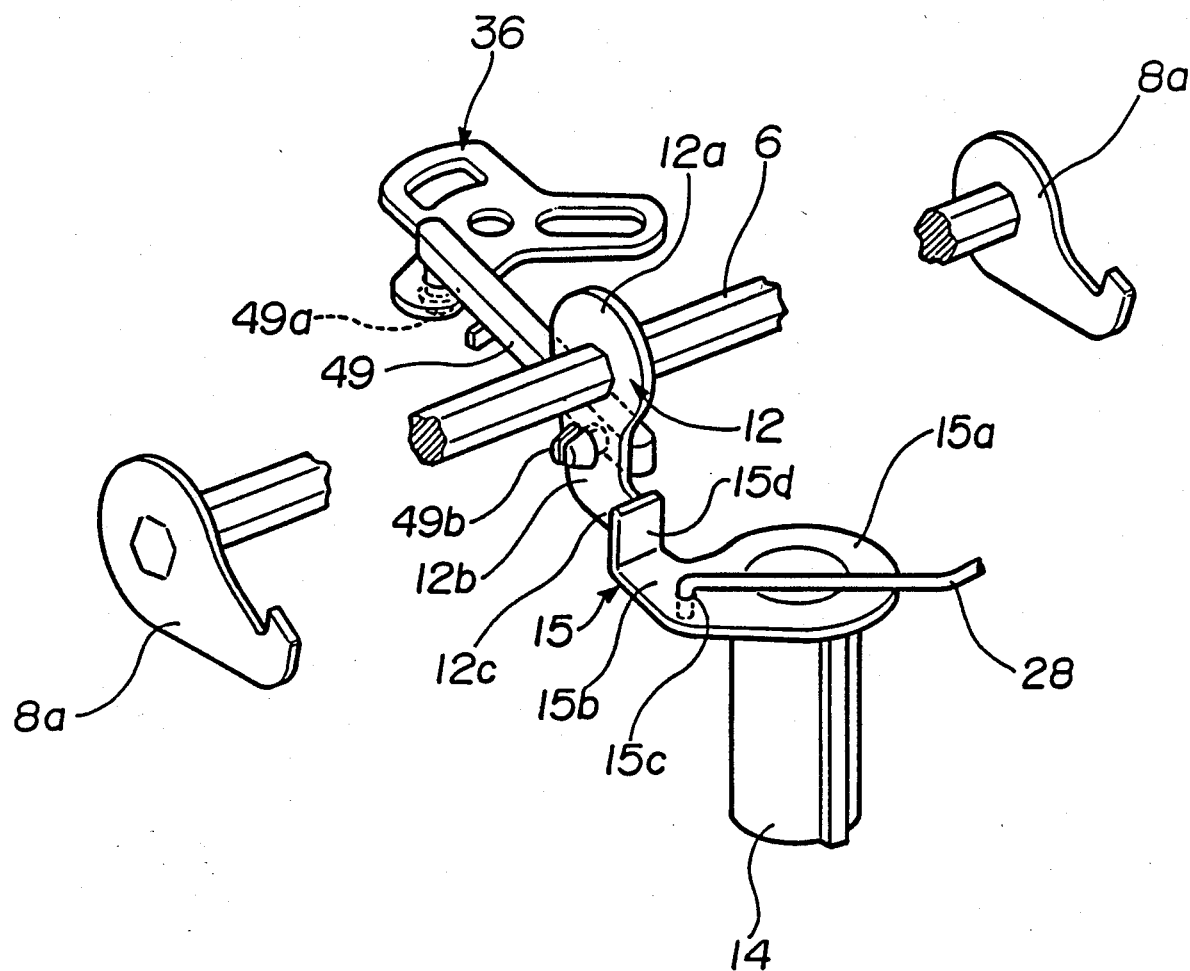
FIG. 7 is an enlarged perspective view of a portion of the locking apparatus of the present invention.

On the lid 2a of the trunk bag 2 is provided a single key cylinder device 14 intended to lock and unlock the terminal lock mechanism 4. As best shown in FIG. 7, a rotary plate 15 is provided on an inner leading end or a rotating portion of the key cylinder device 14. The rotary plate 15, as described in detail hereinafter, is intended to engage with the rotary lever 12 for rotating the rotary shaft 6 whereby the pawls 8a are capable of engaging with, and disengaging from, the hooks 10.

Each of the angularly spaced positions of the key cylinder device 14, shown at A, B and C in FIG. 1, corresponds respectively to a simultaneous lock position, a simultaneous unlock position and a direct unlock position. That is, the key, when in the position "A", is in a lock condition in which the rotary shafts 6 and 7 cannot be rotated if an operating lever (described hereinafter) were operated. If the position "B" is obtained by rotating the key cylinder device 14 a certain angular extent in a clockwise direction from the lock condition of position "A", a lock releasable condition; that is, an unlock position, is achieved in which the rotary shaft 6 or 7 can be rotated by the operating lever. Conversely, when the position "C" is obtained by rotating the key cylinder device 14 in a counterclockwise direction, the rotary plate 15, by rotating together with the key cylinder device 14, abuts with the rotary lever 12. As a result, the rotary shaft 6, which is in an integral relationship with the rotary lever 12, can be rotated (see FIG. 7 and the detailed description hereinafter), only until it reaches the direct unlock position which releases directly the terminal lock portion 4. Further, the key 16 may be the same key as that for operating the main switch of the motorcycle. The key 16 is adapted to be inserted into and pulled from the key cylinder device 14 in two positions between the lock position "A" and the unlock position "B" of FIG. 1.

Also, above the recess 1b at the back side of base portion 2b of the trunk bag 2 are provided three operating levers 17a, 17b, 17c, which are independently operable in order to unlock the terminal lock mechanisms 4 and 5 of the trunk bag 2 and the saddle bag 3, respectively. The operating levers, so positioned, are difficult to see from the outside and, therefore, difficult to vandalize. Furthermore, since the operating lever arrangement can be provided with an ornamental effect in that it does not have any external projection from any surface of the trunk bag 2 or the saddle bag 3, it does not detract esthetically from the appearance of the vehicle. Moreover, since the hand of the operator, when operating each of the operating levers, has ready access to the back surface of the base portion 2b along the recess 1b, as shown by the arrow, the levers can be easily operated.

Between the operating levers 17a, 17b, 17c and the terminal lock mechanisms 4, 5 is positioned a centralized control 18 which is capable of switching the terminal lock portions 4 and 5 into the simultaneous lock position, or the simultaneous unlock position. Further, between the operating levers 17a, 17b, 17c and the terminal lock mechanisms 4 and 5 (left and right) are provided swing mechanisms, indicated generally as 20, 21, 22, respectively, described in detail hereinafter. That is, in the trunk bag 2, the terminal lock mechanism 4 is connected with the operating lever 17b through the intermediary of the swing mechanism 20 that includes a wire 19b and a driving member 49. Similarly, via the swing mechanism 21, the left side terminal lock mechanism 5 is connected with the operating lever 17a through the intermediary of wires 19a and 19d. Further, via the swing mechanism 22, the right side terminal lock portion 5, which cannot be seen in the drawing figures, but is provided symmetrically on the right side of the trunk bag, is connected with the operating lever 17c through the intermediary of wires 19c and 19e. These swing mechanisms 20, 21, 22 correspond to the switching mechanism according to the present invention together with an interlocking mechanism 24 described hereinafter.

FIGS. 3 to 11 show in detail structures of a centralized control 18 and the swing mechanisms 20, 21, 22. Each of the respective figures illustrate the centralized control 18 in a condition rotated about 90° from the condition of FIG. 2. Among them, FIGS. 3 and 4 each show a general structure of the centralized control apparatus 18, while FIGS. 5 to 11 show mainly exploded structures of the swing mechanisms 20, 21, 22, and their actuation apparatus.

Figure 3:
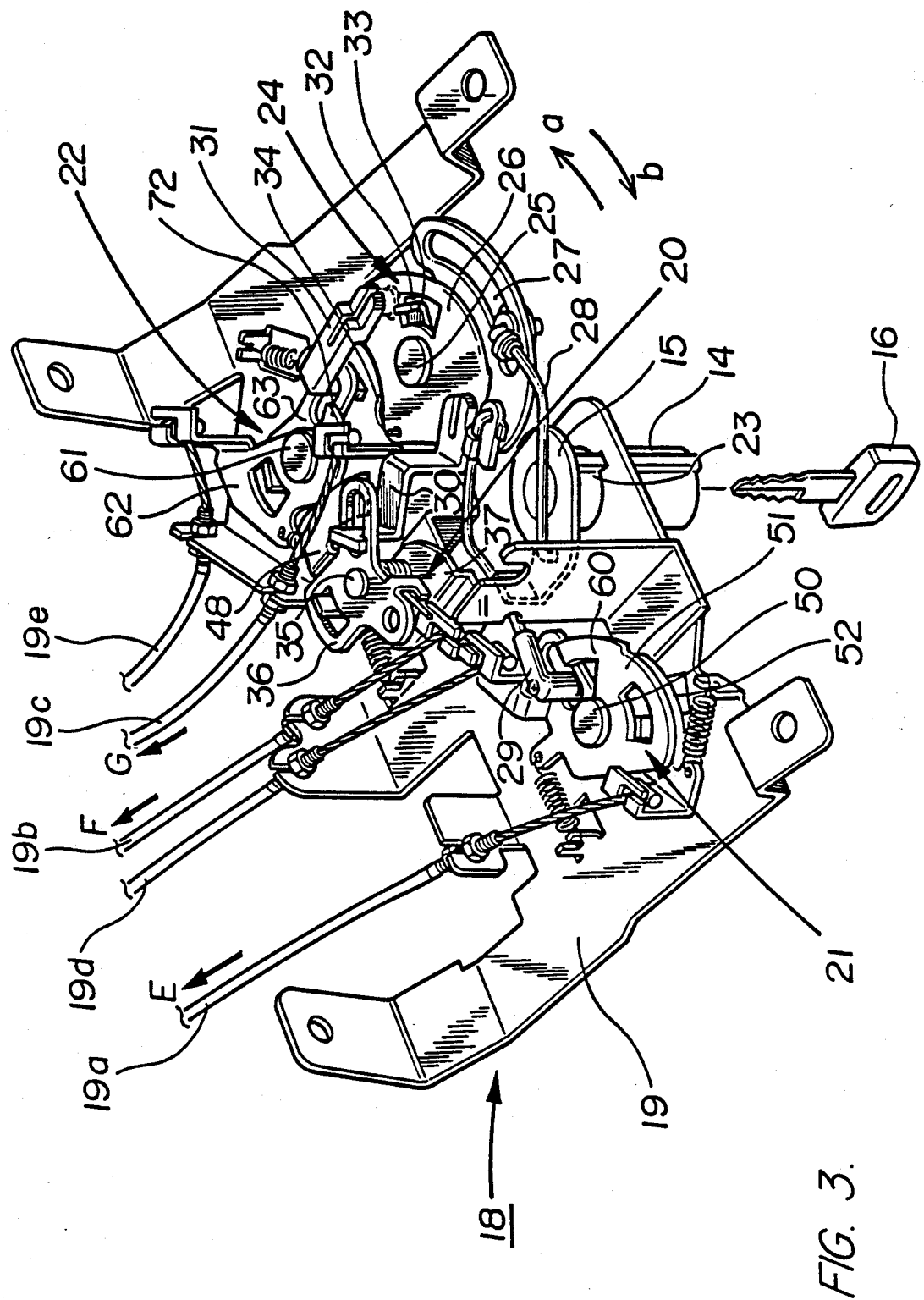
FIGS. 3 and 4 are enlarged perspective views illustrating the centralized lock device in various operational conditions.

Firstly, the centralized control 18 will be summarily described with reference to FIGS. 3 and 4. In the base plate 19 is provided a mounting bore 23 for mounting the key cylinder device 14. The rotary plate 15 is integrally formed for rotation on the key cylinder device 14. About the device 14 and the rotary plate 15, are arranged the interlocking mechanism 24, the swing mechanism 20 of the trunk bag 2, and the swing mechanisms 21, 22 of the left and right saddle bags 3, 3, respectively. The interlocking mechanism 24 comprises a rotary plate 26 mounted for rotation about shaft 25 and contains a guide groove 27 on the peripheral edge portion thereof. A driving member 28 engages the guide groove 27 at one end. The other end of the driving member 28 is connected to a rotary plate 15 of the key cylinder device 14. Thus, as shown in FIG. 3, the engaging end of the driving member 28 in the guide groove 27 is capable of being moved in either direction, "a" or "b", by interlocking with rotation of the key cylinder device 14.

On the rotary plate 26 are mounted three driving members 29, 30, 31 which are connected to the swing mechanisms 20, 21, and 22, respectively. The latter mechanisms are moved by each of the driving members to interlock with the rotation of the rotary plate 26 whereby it is possible to switch between a swinging position, which is a lock position, and a connecting position, which is an unlock position.

In an engaging slot 32 provided on the rotary plate 26 is engaged a stopper 33 projecting from the base plate 19, whereby the rotating range of the plate 26 is determined. On the back side of the rotary plate 26 is provided a torsion spring 34 so as to rotatably bias the rotary plate 26. Further, FIG. 3 shows the locked condition of the centralized control 18 in which each of the swing mechanisms 20, 21, 22 is in its swinging position, and FIG. 4 shows the unlocked condition of the centralized control 18 in which each of the swing mechanisms 20, 21, 22 is in its connecting position.

Figure 5:
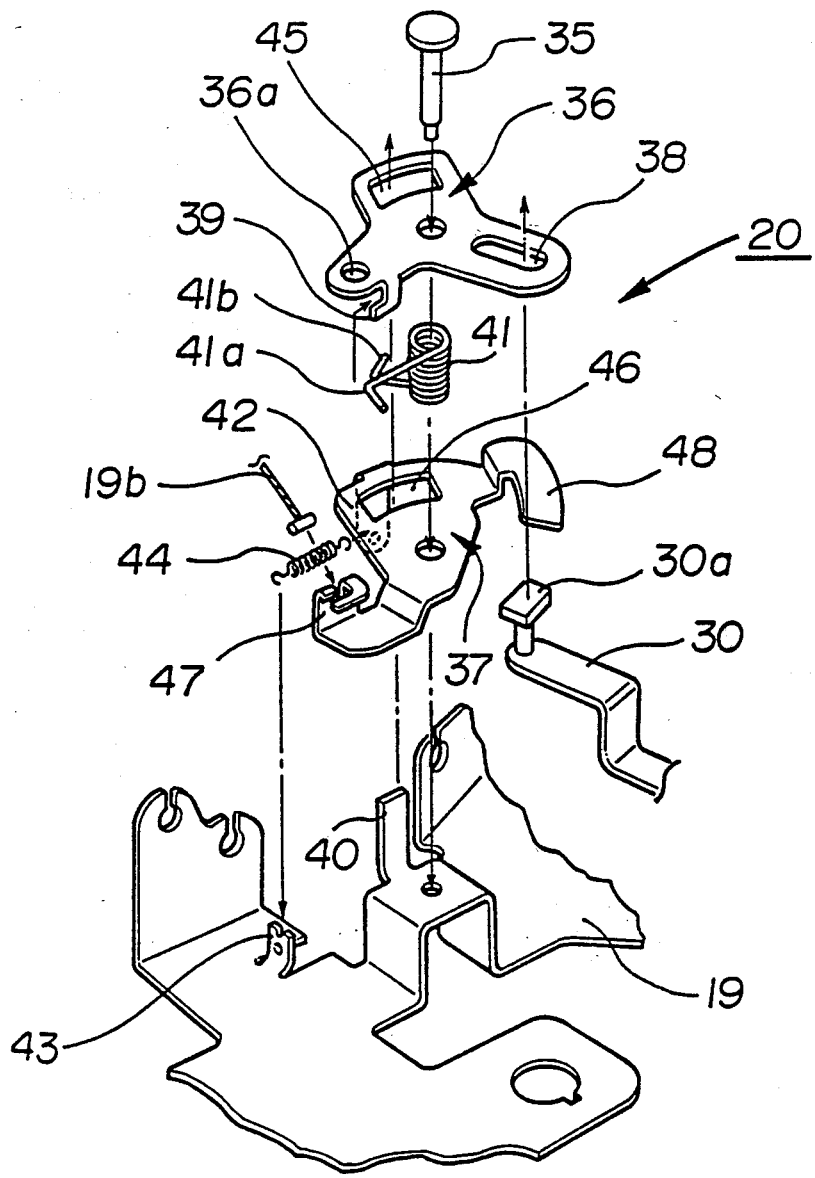
FIGS. 5, 8 and 10 are exploded views of switching mechanisms according to present invention.
Figure 6:
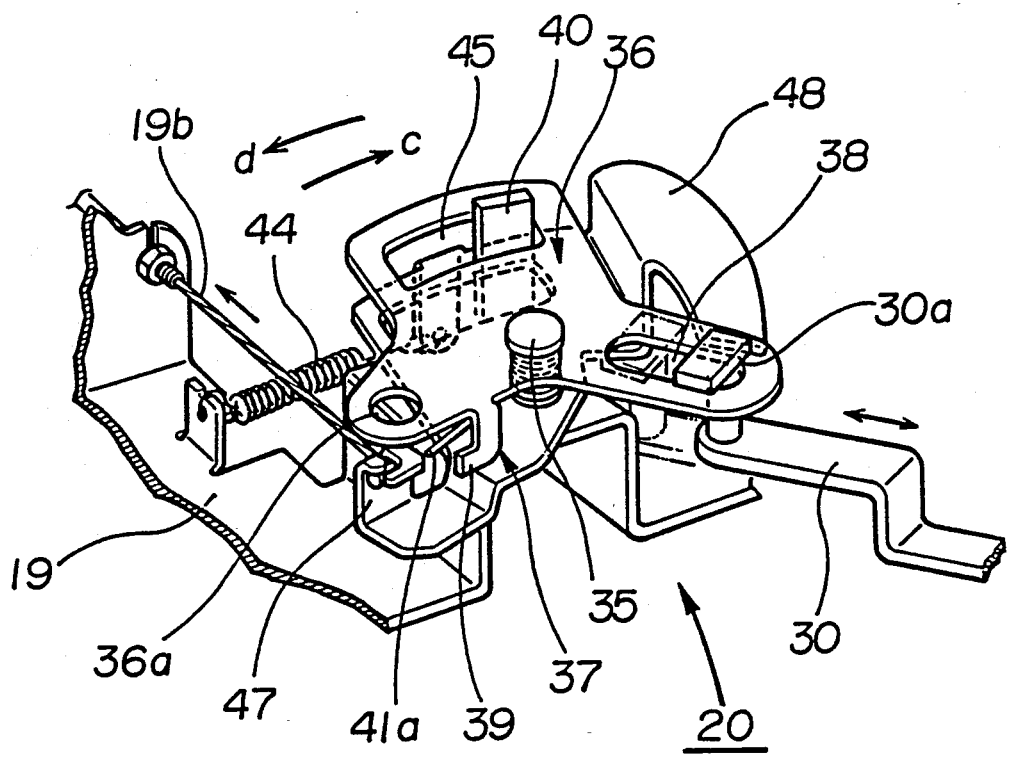
FIGS. 6, 9 and 11 are perspective views of the switching mechanisms of FIGS. 5, 8 and 10.

FIGS. 5 and 6 show an exploded view and an operating view, respectively, of the swing mechanism 20. The swing mechanism 20 has an upper rotary plate 36 and a lower rotary plate 37 mounted for rotation about a shaft 35. An enlarged end portion 30a of the driving member 30 is adapted for sliding engagement in a guide groove 38 that extends perpendicularly through the upper rotary plate 36. The plate 36 is angularly biased in the clockwise direction ("c" direction) by positioning a torsion coil spring 41 between the upper rotary plate 36 and the lower rotary plate 37 and engaging its respective ends 41a, 41b with a pawl portion 39 provided in the upper rotary plate 36 and with a stopper 40 provided on the base plate 19. On the other hand, the lower rotary plate 37 is rotated and energized in the counter clockwise direction ("d" direction) by a tension coil spring 44 tensed between a bracket 42 provided on the lower rotary plate 37 and a pawl portion 43 provided on the base plate 19. Further, the rotating range of he elements 36 and 37 in the "c" and "d" directions is determined by the insertion of the fixed stopper 40, which projects from the base plate 19, into elongated slots 45, 46, of the upper and the lower rotary plates 36 and 37, respectively.

On the lower rotary plate 37 are formed a holder portion 47, an operating pawl 48, and a wire 19b connected to the holder portion 47. Also, in a connecting bore 36a of the upper rotary plate 36 is mounted one end of the driving member 49 (FIG. 7). Thus, if the wire 19b is pulled, the lower rotary plate 37 rotates in the clockwise direction against the force of the tension coil spring 44 so as to pull the driving member 49. The operating pawl 48 on the lower rotary plate 37 has its free end extending to the side of the guide groove 38 of the upper rotary plate 36. A leading end portion of the driving member 30 is movably arranged for engagement with the free end of the operating pawl 48.

FIG. 6 shows a condition in which a leading end of the driving member 30 contacts the leading end of the operating pawl 48. The rotation of the lower rotary plate 37 is thus transmitted to the upper rotary plate 36 through the intermediary of the driving member 30. In a reverse case, the driving member 30 displaces toward the left in the slot 38 in FIG. 6 and disengages from the operating pawl 48. In this case, even if the lower rotary plate 37 has rotated and the operating pawl 48 undergoes its swinging movement, the rotation is not transmitted to the upper rotary plate 36.

FIG. 7 shows the connecting structure between the driving member 49 and the key cylinder 14. That is, on one end of the driving member 49 is formed a mounting pin 49a which extends downward through the rotary plate 36 and is provided with an enlarged head and a split groove in its center. The mounting portion 49a is interconnected with the rotary plate 36 by force fitting the mounting portion 49a into the connecting bore 36a of the rotary plate 36. On the other end of the driving member 49 a similar mounting portion 49b extends laterally, it being connected by force fitting into a connecting bore formed in an intermediate portion 12b of the rotary lever 12. The lever 12 at one end contains a mounting portion 12a for mounting to the rotary shaft 6 which is hexagonal in section and that mounts pawls 8a at opposite ends. At the other end, the lever 12 has an abutting portion 12c extending from the intermediate portion 12b. This abutting portion 12c is adapted to abut an upturned tab 15d on the leading end of the extending portion 15b of the rotary plate 15 of the key cylinder 14. Further, the rotary plate 15 is adapted to be fixed to the rotary member of the key cylinder device 14 at a mounting portion 15a and to connect the end of the driving member 28 via a connecting bore 15c formed in the extending portion 15b.

Accordingly, if the key cylinder device 14 is operated to rotate the rotary plate 15 in the clockwise direction, the abutting portion 12c abutting the bent portion 15d is pushed. Then, the rotary lever 12 is rotated in the clockwise direction in FIG. 7 seen from the left and simultaneously the rotary shaft 6 is integrally rotated whereby the engagement of the pawls 8a with the hooks 10 is released independently of the actuation of the centralized control 18. Further, as mentioned above, if the upper rotary plate 36 is forced to rotate in the direction shown by the arrow "c" of FIG. 6 when the swing mechanism 20 is in the unlock position, since the driving member 49 interlocks with the actuation of the upper rotary plate 36 and is pulled by it, similarly the rotary lever 12 is rotated in the engaging direction of the pawl 8a. Conversely, if the swing mechanism 20 is in the lock position, as mentioned above, the lower rotary plate 37 lies in the swinging condition, and the upper rotary plate 36 is not rotated. As a result of this, the engaging condition is maintained without allowing the driving member 49 and the rotary shaft 7 to be rotated.

Figure 8:
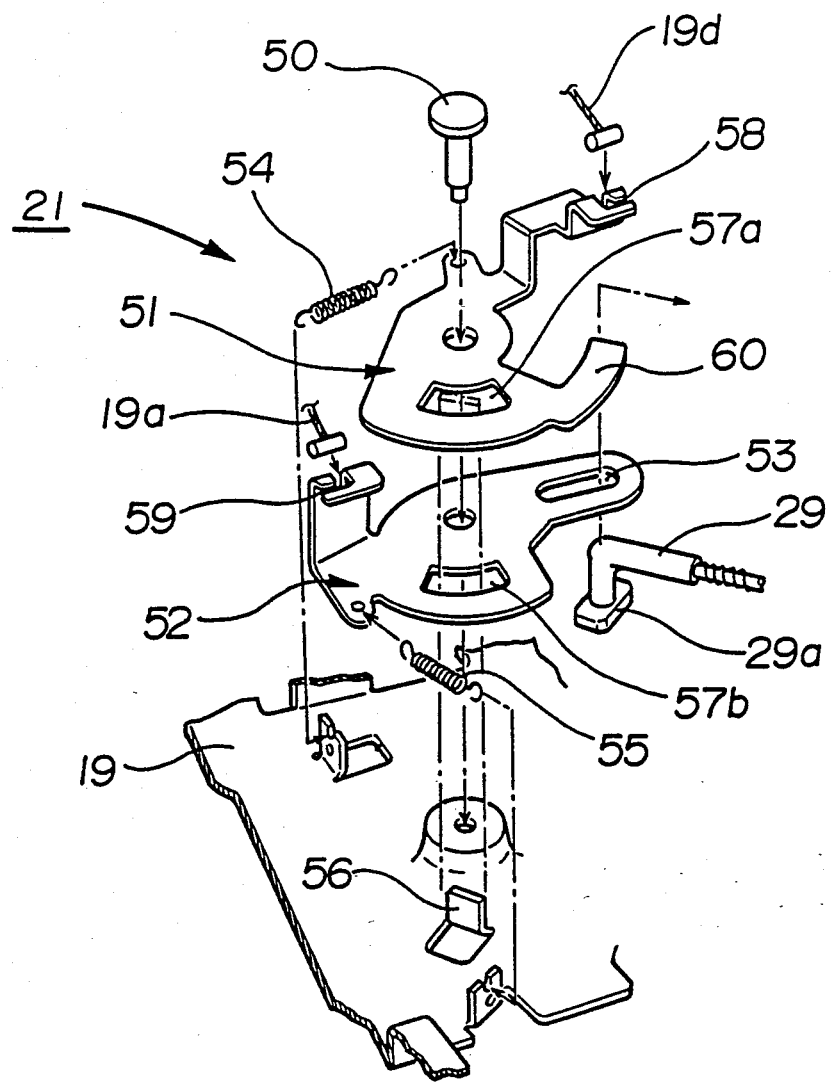
Figure 9:
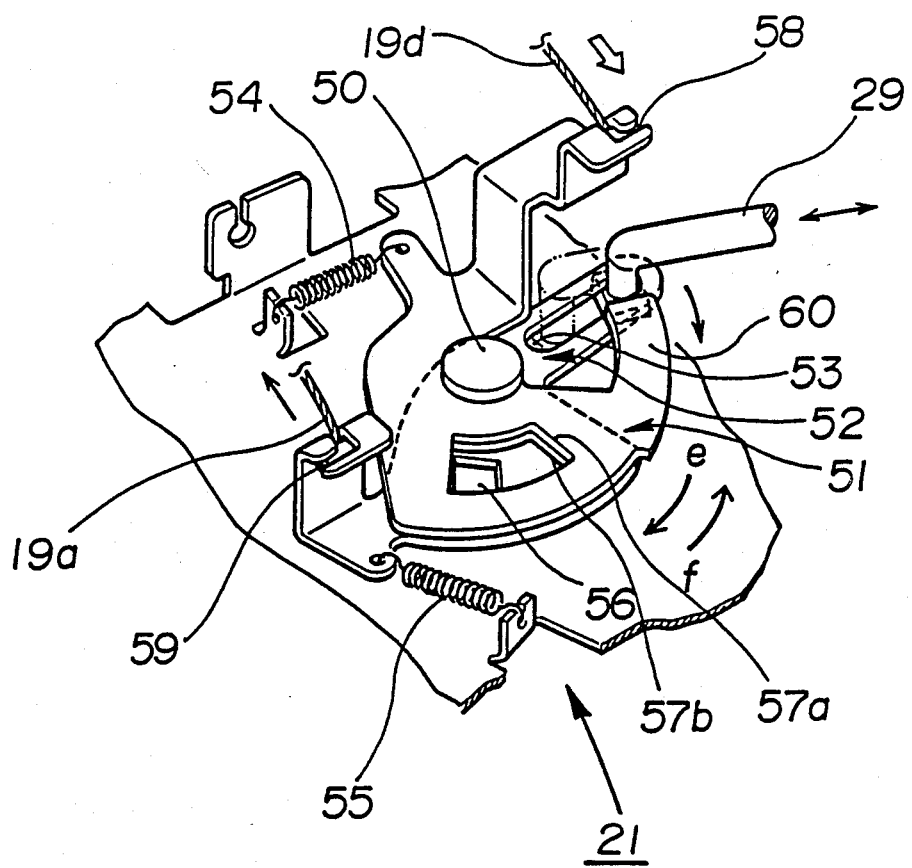

FIGS. 8 and 9 show an exploded view and an operating view, respectively, of the swing mechanism 21. The swing mechanism 21 has an upper rotary plate 51 and a lower rotary plate 52 rotating about a shaft 50. An enlarged end portion 29a of the driving member 29 movably extends normally through a guide groove 53 in the upper rotary plate 51. The upper and the lower rotary plates 51 and 52 are energized by tension coil springs 54, 55 in the counterclockwise direction ("f" direction). Further, the rotating range in the "f" direction is determined by inserting a stopper 56 provided on the base 19 into elongated bores 57a, 57b of the respective upper and lower rotary plates 51 and 52. To a holder portion 58 of the upper rotary plate 51 and a holder portion 59 of the lower rotary plate 52 are connected wires 19d and 19a, respectively. When the wire 19a is pulled, the lower rotary plate 52 is adapted to rotate in the clockwise direction ("e" direction) against the force of the tension coil spring 55. On the upper rotary plate 51 is provided the operating pawl 60 positioned to one side with respect to a longitudinal direction of the guide groove 53 of the lower rotary plate 52. A leading end portion of the driving member 29 is movably arranged in the rotary path of the operating pawl 60.

FIG. 9 shows a condition in which the leading end of the driving member 29 is in contact with the leading end of the operating pawl 60. In this condition, the rotation of the lower rotary plate 52 is transmitted to the upper rotary plate 51 through the intermediary of the driving member 29. In a reverse case, the leading end of the driving member 29 is displaced toward the left in the slot 53 as shown in FIG. 9, and disengages from the operating pawl 60. For this reason, even if the lower rotary plate 52 has rotated, the operating pawl 60 performs the swinging actuation and the rotation of the lower rotary plate 52 is not transmitted to the upper rotary plate 51.

Figure 10:
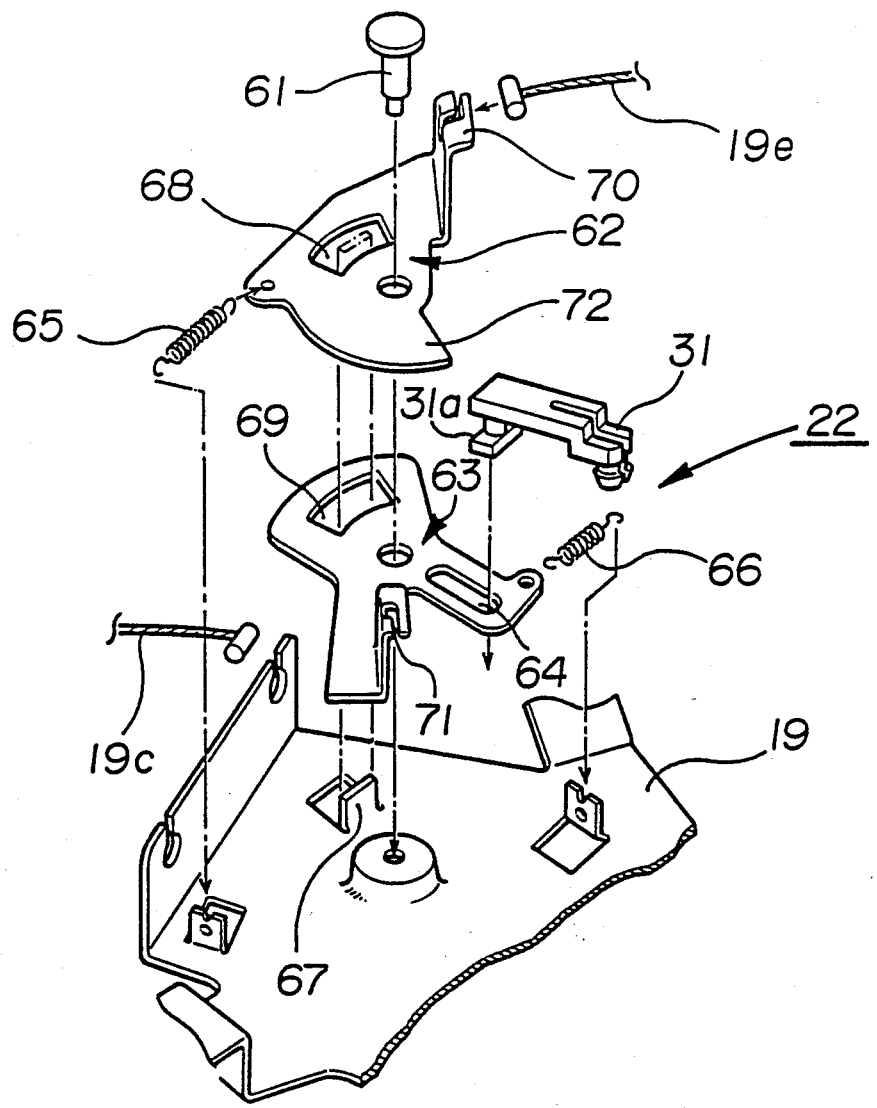
Figure 11:
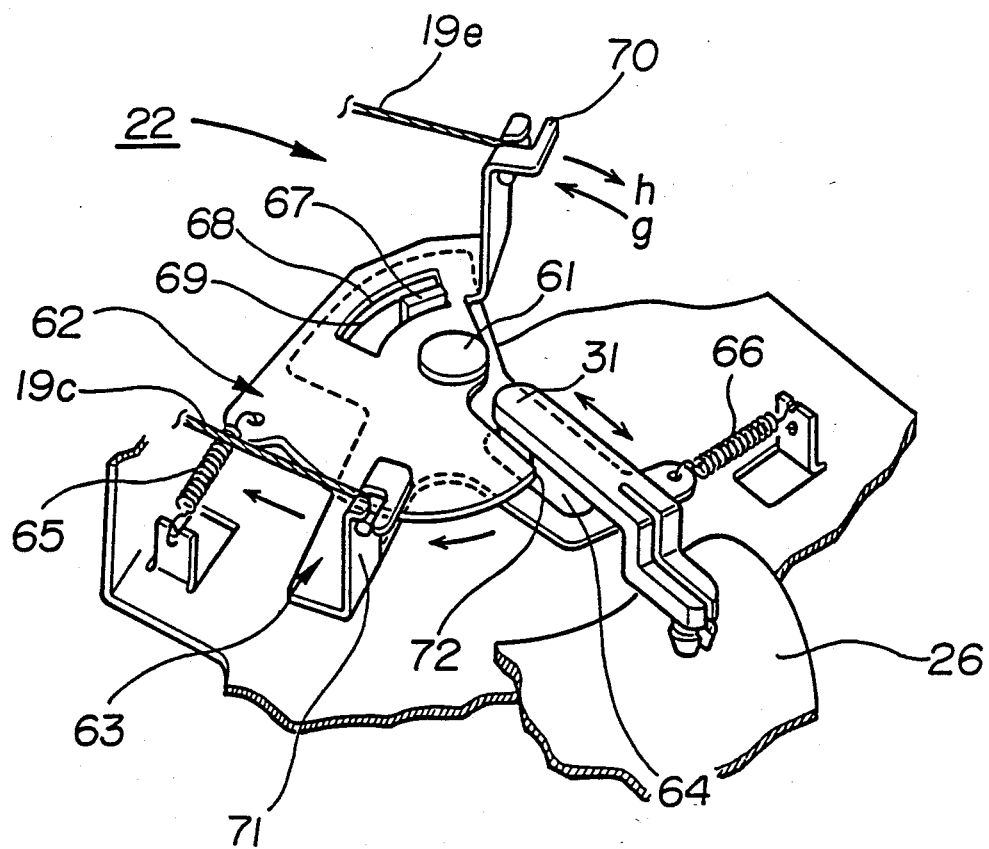

FIGS. 10 and 11 show an exploded view and an operating view, respectively, of the swing mechanism 22. The swing mechanism 22 has an upper rotary plate 62 and a lower rotary plate 63 rotating about a shaft 61. An enlarged end portion 31a of the driving member 31 extends movably through a guide opening 64 extending perpendicularly through the upper rotary plate 63. The upper and lower rotary plates 62 and 63 are urged by tension coil springs 65, 66 in the counterclockwise direction (37 g" direction). Further, the rotating range of the plates in the "g" direction is determined by the stopper 67 of the base plate 19 which extends into elongated bores 68, 69 in the upper and the lower rotary plates 62 and 63, respectively. Also, to a holder portion 70 of the upper rotary plate 62 and a holder portion 71 of the lower rotary plate 63 are connected the wires 19e and 19c, respectively. Thus, by pulling the wire 19c, the lower rotary plate 63 is adapted to rotate in the clockwise direction ("h" direction) against the force of the tension coil spring 66. On the upper rotary plate 62 is provided an operating pawl 72 positioned at one side in a longitudinal direction of the guide groove 64. The leading end portion of the driving member 31 is movably arranged on the rotary path of the operating pawl 72.

FIG. 11 shows a connecting condition in which a leading end of the operating pawl 72 is contacts the leading end of the driving member 31. In this condition, the rotation of the lower rotary plate 63 is transmitted to the upper rotary plate 62 through the intermediary of the driving member 31. In a reverse case, when the leading end portion of the driving member 31 moves toward the right along the guide groove 64 it disengages from the operating pawl 72. Accordingly, the lower rotary plate 63 performs the swinging actuation and the rotation is not transmitted to the upper rotary plate 62.

Returning to FIGS. 1 to 4, the operation of the centralized control 18 is described. First, when the key 16 is rotated to the position "A" shown in FIG. 1 and is taken out from the key cylinder device 14, the centralized control 18 is disposed in the simultaneous lock condition illustrated in FIG. 3. With the centralized control 18 in this condition the terminal lock mechanisms 4 and 5 cannot be unlocked even if any one of the operating levers 17a, 17b, 17c is operated, whereby the trunk bag 2 and the saddle bags 3 cannot open. That is, by the rotation of the key cylinder device 14, the rotary member 15 rotates in the counterclockwise direction, and, when one end of the guide groove 27 is pushed while the driving member 28 is moved in the direction "b", the rotary plate 26 is rotated in the direction "b". Accordingly, by means of the interlock action, the driving members 29, 30, 31 displace and switch into the contacting positions with the operating pawls 48, 60, 70 of the respective swing mechanisms 20, 21, 22. As a result of this, the wires 19a, 19b, 19c connecting with the respective operating levers 17a, 17b, 17c are adapted to interrupt the connection with the wires 19d, 19e and the driving member 49 which perform the unlocking of the terminal lock mechanisms 4, 5. Therefore, even if any one of the operating levers 17a, 17b, 17c is depressed in a direction shown by an arrow "D" in FIG. 2 and the wires 19a, 19b, 19c connecting with the operating levers are pulled in the directions shown by arrows E, F and G in FIG. 3, these movements only swing the operating pawls 48, 60, 72 that are connected to the leading end portions of the respective wires. Accordingly, the operating force is not transmitted to the terminal lock mechanisms 4, 5 and therefore, they are not unlocked. Furthermore, in the simultaneous lock condition of the centralized control 18, even if a strong force is applied to each of the operating levers by operating them carelessly, since the swing mechanism actuates, damage of the operating lever is avoided.

Figure 4:
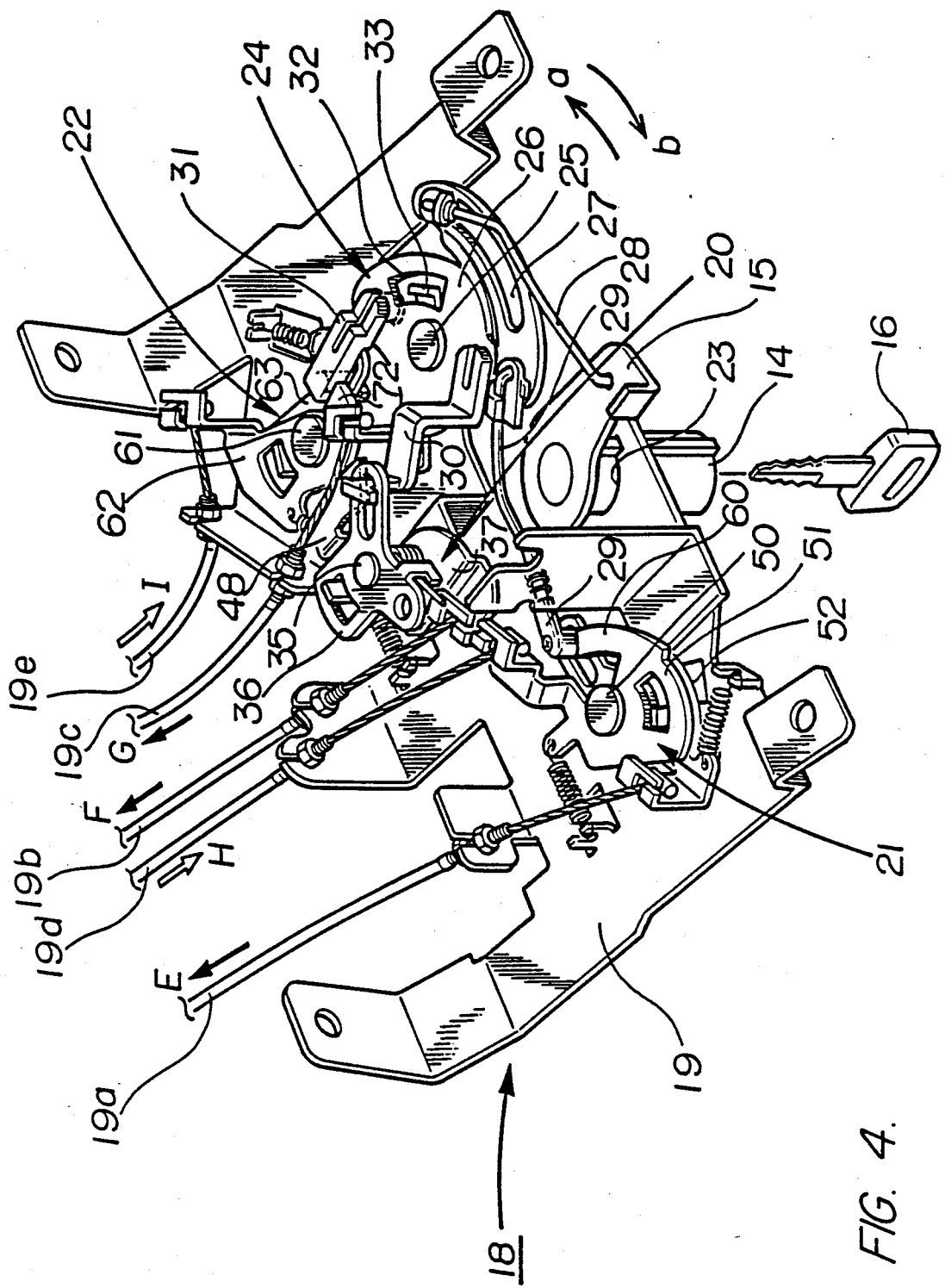

Also, when the key 16 is inserted into the key cylinder device 14 and is rotated to the position "B" in FIG. 1, the centralized control 18 becomes disposed in the unlocked condition illustrated in FIG. 4. Then, the trunk bag 2 and the saddle bags 3, 3 are capable of opening at all times, without operating the key, by operating each of the operating levers 17a, 17b, 17c with a single touch. That is, when the key cylinder device 14 is rotated to the position "B" in FIG. 1, the rotary plate 15 rotates in the clockwise direction. With this, the driving member 28, as shown in FIG. 4, slides to the other end side of the guide groove 27 to push the rotary plate 26, whereby the latter moves to a condition rotated in the direction "a". Accordingly, because they are interlocked with the plate 26, the driving members 29, 30, 31 displace and switch into their respective positions of contact with the operating pawls 48, 60, 72 of the swing mechanisms 20, 21, 22. As a result of this, the wires 19a, 19b, 19c connecting with the operating levers 17a, 17b, 17c assume the connecting condition with the wires 19d, 19e and the driving member 49 which perform the unlocking operation of the terminal lock mechanisms 4, 5. Then, if any of the operating levers 17a, 17b, 17c is depressed in the direction shown by the arrow "D" in FIG. 2 and the wires 19a, 19b, 19c connecting with the operating levers are pulled in the directions shown by arrows E, F, G in FIG. 4, this operating force is transmitted to either of the corresponding wires 19d, 19e or to the driving member 49 via any of the operating pawls 48, 60, 72 connected to the leading ends of the wires and the latter are pulled in directions shown by arrows "H" and "1". As a result of this, the rods 6 or 7 may be rotated via the corresponding rotary levers 12 or 13 to unlock any of the terminal lock mechanisms 4 or 5. Further, when any of the storage portions are closed after opening them, the associated terminal lock mechanisms 4, 5 becomes disposed in the engaging condition. However, since the centralized control 18 maintains the unlock condition shown in FIG. 4, the respective storage portions can be operated to be opened at all times by operation of the associated operating lever. Further, the key 16 can be removed from the key cylinder device 14 when in either the position, "A", or the position, "B". Therefore, if the centralized control 18 is kept at the unlock condition during driving, the driver is released from the inconvenience of having to stop the engine to remove the key from the main switch in order to use the key to operate the terminal lock portions of the bags.

Further, as shown in FIG. 1, if the key cylinder device 14 lies in the position "C", the system is disposed in the direct unlock position. That is, as described with respect to FIG. 7, if the key cylinder device 14 is placed by the key 16 to the position "C" by rotation of the key rod 15 in the direction shown by the arrow "K" (FIG. 2), only the rotary shaft 6 can rotate, such rotation being in the direction shown by the arrow "L" so as to unlock the terminal lock portion 4 by moving the pawls 8a from engagement with the hooks 10. As a result of this, only the trunk bag 2 can be opened. Further, none of the bags can be opened by the operating levers 17a, 17b, 17c. Therefore, such mode of operation is advantageous in cases where it is unnecessary to open the side bags 3, 3.

This position, "C", is particularly advantageous when an emergency lock is included as mentioned below. That is, in this embodiment, as shown in FIG. 2, on the base portion of the trunk bag 2 is provided the emergency lock 73 which is connected to the adjacent saddle bag 3. Therefore, even if there is imperfect operation of the operating levers 17a, 17b, 17c, or the wires 19a, 19b, 19c, or the centralized control 18, the emergency lock 73 makes it possible to unlock the saddle bag 3. In the emergency lock 73, its operating portion is located below an opening 74 provided on a corner of the base portion 2b. On one end portion of a lever 76 is connected a rod 75 which constitutes part of the emergency lock 73. Further, the other end portion of the lever 76 is formed integrally with the rotary shaft 7. Thus, after opening the lid 2a by the key 16 and inserting an appropriate member, such as a leading end of a screwdriver or the like, into the opening 74, the operating portion of the emergency lock 73 can be depressed, to rotate the lever 76 downwardly via the rod 75 whereby the rotary shaft 7 is adapted to rotate in a direction shown by an arrow "M". As a result of this, the pawls 9a are disengaged from the hooks 11. Further, since access to the emergency lock 73 is through the opening 74, the lock cannot be opened inadvertently.

According to the present invention, since the operating levers are arranged together for remote operation of each of the terminal lock portions, the centralized operation of the lock portions is conveniently permitted notwithstanding each of the terminal lock mechanisms is provided at a removed location, that is, at the upper portion and the left and right portions of the vehicle body spaced away from each other. Furthermore, the operability, as well as the reliability, of the locking function is increased since the system has a direct unlock position and the emergency lock 73.

The present invention is not limited to the embodiment mentioned above, but is adapted for modification and for various applications. For example, as a switching mechanism of the centralized control, each of the terminal lock portions and the operating lever can be connected without providing the swing mechanism whereby the operating lever of the connecting wire can be locked or unlocked by rotating the key cylinder device. As a further example, a ratchet mechanism can be provided on each terminal lock portion, whereby the arrangement is such as to be capable of directly engaging and disengaging with the rotary shaft and the rotary lever of the terminal lock portion and to thereby be capable of limiting their rotations. Further, centralized disposition of the operating levers can be dispensed with and each respective operating lever can be directly associated with each of the terminal lock portions, respectively.

Accordingly, there is provided a centralized control portion, according to the present invention, that is functionally interlocked with each of the terminal lock portions of a plurality of vehicle storage bags for operation via a single key cylinder device. Therefore, by simply operating the key cylinder device, the switching mechanism can be switched alternatively into independent lock or unlock positions or centrally operated for the simultaneous locking and unlocking of each of the terminal lock portions. Accordingly, it is unnecessary to operate the key for each separate bag, and, when the driver is separated from the vehicle, the lock operation can be rapidly effected only by one key operation. When it is desired to open and close each of the bags, if the centralized control portion lies in the unlock position, the opening and closing of each bag can be accomplished without operating the key each time. Therefore, the operability of each bag can be remarkedly improved in the case of a vehicle carrying a plurality of bags.

It should be understood from the above, therefore, that, although a preferred embodiment of the invention has been illustrated and described herein, changes and modifications can be made in the described arrangement without departing from the scope of the appended claims.

We claim:
1. The combination comprising:
a plurality of storage containers;
a closure lid on each said storage container;
latch means on each said closure lid for releasably securing said lid to its associated container;
an operator for each said latch means and being remote therefrom, said operator including elongated cable means operatively connected between said operator and said latch means;
selectively actuable control means operable in a first condition to render each said operator effective to release its associated latch means and operable in a second condition to render each said operator ineffective to release its associated latch means;
means operated by said control means interposed in said cable means for interrupting the connection between said operator and said latch means, said connection interrupting means including a swing mechanism comprising a pair of rotatably mounted plates; means on each of said plates for attaching respective ends of said cable means; and means for selectively connecting and disconnecting said rotary plates.

2. The combination according to claim 1 in which said connecting and disconnecting means includes a pawl on one of said rotatably mounted plates and a selectively movable drive mechanism engageable with said pawl for operatively connecting said plates and disengageable from said pawl for operatively disconnecting said plates.

3. The combination according to claim 2 including a movable interlock mechanism mounting a plurality of drive mechanisms for movement with respect to an associated pawls; and means for selectively moving said interlock mechanism for moving said drive mechanisms with respect to its associated pawl.

4. The combination according to claim 3 including a key-responsive actuator for moving said interlock mechanism.

5. In a motorcycle, the combination comprising:
a trunk storage container;
at least one side storage container spaced from said trunk storage container;
a closure lid on each said storage container;
latch means on each said closure lid for releasably securing said lid to its associated container;
an operator for each said latch means, said operators are centrally disposed on said motorcycle remote from said latch means and including elongated cable means operatively connected between said operator and said latch means;
selectively actuable control means operable in a first condition to render each said operator effective to release its associated latch means and operable in a second condition to render each said operator ineffective to release its associated latch means; and
means operated by said control means interposed in said cable means for interrupting the connection between said operator and said latch means, said connecting interrupting means including a swing mechanism comprising a pair of rotatably mounted plates, means on each of said plates for attaching respective ends of said cable means, and means for selectively connecting and disconnecting said rotary plates.

6. The combination according to claim 5 in which said connecting and disconnecting means includes a pawl on one of said rotatably mounted plates and a selectively movable drive mechanism engageable with said pawl for operatively connecting said plates and disengageable from said pawl for operatively disconnecting said plates.

7. The combination according to claim 6 including a movable interlock mechanism mounting a plurality of drive mechanisms for movement with respect to an associated pawl; and means for selectively moving said interlock mechanism for moving said drive mechanisms with respect to its associated pawl.

8. The combination according to claim 7 including a key-responsive actuator for moving said interlock mechanism.

* * * * *